(12) United States Patent
Attaluri et al.

(10) Patent No.: US 10,387,397 B2
(45) Date of Patent: Aug. 20, 2019

(54) PARALLEL BUILD OF NON-PARTITIONED JOIN HASH TABLES AND NON-ENFORCED N:1 JOIN HASH TABLES

(71) Applicant: INTERNATIONAL BUSINESS MACHINES CORPORATION, Armonk, NY (US)

(72) Inventors: Gopi K. Attaluri, San Jose, CA (US); Ronald J. Barber, San Jose, CA (US); Ippokratis Pandis, Palo Alto, CA (US); Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/850,383

(22) Filed: Dec. 21, 2017

(65) Prior Publication Data

US 2018/0113864 A1    Apr. 26, 2018

Related U.S. Application Data

(63) Continuation of application No. 14/664,710, filed on Mar. 20, 2015, now Pat. No. 9,922,064.

(51) Int. Cl.
*G06F 17/30* (2006.01)
*G06F 16/22* (2019.01)
*G06F 16/2455* (2019.01)

(52) U.S. Cl.
CPC ...... *G06F 16/2255* (2019.01); *G06F 16/2456* (2019.01)

(58) Field of Classification Search
CPC .................. G06F 16/2255; G06F 16/2456
(Continued)

(56) References Cited

U.S. PATENT DOCUMENTS 5,455,826 A    10/1995  Ozveren et al.
5,598,559 A    1/1997   Chaudhuri
(Continued)

FOREIGN PATENT DOCUMENTS

CN    1522409 A    8/2004
CN    1968212 A    5/2007
(Continued)

OTHER PUBLICATIONS

Anonymous, "System and Method for Usage Aware Row Storage in Database Systems", Jul. 23, 2010, pp. 1-4, ip.com, United States.
(Continued)

*Primary Examiner* — Isaac M Woo
(74) *Attorney, Agent, or Firm* — Sherman IP LLP; Kenneth L. Sherman; Steven Laut

(57) ABSTRACT

A method for building a hash table over a subset of data in a data set includes partitioning a subset of keys and values in the data set into multiple partitions. A hash table is formed with space reserved for each partition based on cumulative counts for a number of keys and values in each partition of the multiple partitions. Each thread selects one or more partitions and inserts keys and values belonging to the selected one or more partitions into the hash table in the reserved space for those partitions. A compact hash table is created that includes a bitmap and a compacted array.

19 Claims, 9 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 5,740,440 A | 4/1998 | West | |
| 5,794,229 A | 8/1998 | French | |
| 5,893,086 A | 4/1999 | Schmuck et al. | |
| 5,930,785 A | 7/1999 | Lohman et al. | |
| 6,026,394 A | 2/2000 | Tsuchida et al. | |
| 6,052,697 A | 4/2000 | Bennett | |
| 6,134,601 A | 10/2000 | Spilo et al. | |
| 6,247,014 B1 | 6/2001 | Ladwig et al. | |
| 6,292,795 B1 | 9/2001 | Peters et al. | |
| 6,505,189 B1 | 1/2003 | On Au et al. | |
| 6,609,131 B1 | 8/2003 | Zait et al. | |
| 6,757,677 B2 | 6/2004 | Pham et al. | |
| 6,775,681 B1 | 8/2004 | Ballamkonda et al. | |
| 6,941,432 B2 | 9/2005 | Ronstrom | |
| 6,954,776 B1 | 10/2005 | Cruanes et al. | |
| 7,062,481 B2 | 6/2006 | Pham et al. | |
| 7,136,883 B2 | 11/2006 | Flamma et al. | |
| 7,177,883 B2 | 2/2007 | Yagawa | |
| 7,287,131 B1 | 10/2007 | Martin et al. | |
| 7,293,028 B2 | 11/2007 | Cha et al. | |
| 7,308,539 B2 | 12/2007 | Fuhs et al. | |
| 7,343,363 B1 | 3/2008 | Parker | |
| 7,412,439 B2 | 8/2008 | Bossman et al. | |
| 7,499,960 B2 | 3/2009 | Dageville et al. | |
| 7,653,670 B2 | 1/2010 | Hasan et al. | |
| 7,688,758 B2 | 3/2010 | Denby et al. | |
| 7,716,180 B2 | 5/2010 | Vermeulen et al. | |
| 7,827,182 B1 | 11/2010 | Panigrahy | |
| 7,827,218 B1 | 11/2010 | Mittal | |
| 8,145,642 B2 | 3/2012 | Cruanes et al. | |
| 8,195,644 B2 | 6/2012 | Xu | |
| 8,271,564 B2 | 9/2012 | Dade | |
| 8,321,385 B2 | 11/2012 | Burroughs et al. | |
| 8,346,810 B2 | 1/2013 | Beaverson et al. | |
| 8,370,316 B2 | 2/2013 | Bensberg et al. | |
| 8,438,574 B1 | 5/2013 | Lyle et al. | |
| 8,443,155 B2 | 5/2013 | Adams et al. | |
| 8,661,005 B2 | 2/2014 | McKenney et al. | |
| 8,768,889 B1 | 7/2014 | Martin | |
| 8,768,927 B2 | 7/2014 | Yoon et al. | |
| 8,886,614 B2 | 11/2014 | Morris | |
| 9,098,201 B2 | 8/2015 | Benjamin et al. | |
| 9,355,060 B1 | 5/2016 | Barber et al. | |
| 9,454,560 B2 | 9/2016 | Cha et al. | |
| 9,684,682 B2 | 6/2017 | Mukherjee et al. | |
| 2001/0039609 A1 | 11/2001 | Houldsworth et al. | |
| 2002/0016820 A1 | 2/2002 | DuVal et al. | |
| 2004/0260684 A1 | 12/2004 | Agrawal et al. | |
| 2005/0018683 A1 | 1/2005 | Zaho et al. | |
| 2005/0033741 A1 | 2/2005 | Dombroski et al. | |
| 2006/0218176 A1 | 9/2006 | Sun Hsu et al. | |
| 2007/0136317 A1 | 6/2007 | Przywara | |
| 2007/0244850 A1 | 10/2007 | Hoppe et al. | |
| 2007/0245119 A1 | 10/2007 | Hoppe | |
| 2008/0126706 A1 | 5/2008 | Newport et al. | |
| 2008/0133583 A1 | 6/2008 | Artan et al. | |
| 2008/0162402 A1 | 7/2008 | Holmes et al. | |
| 2009/0006399 A1 | 1/2009 | Raman et al. | |
| 2009/0024568 A1 | 1/2009 | Al-Omari et al. | |
| 2009/0100223 A1 | 4/2009 | Murayama et al. | |
| 2009/0210445 A1 | 8/2009 | Draese et al. | |
| 2009/0222659 A1 | 9/2009 | Miyabayashi et al. | |
| 2010/0088309 A1 | 4/2010 | Petculescu et al. | |
| 2010/0114668 A1 | 5/2010 | Beavin et al. | |
| 2010/0131540 A1 | 5/2010 | Xu et al. | |
| 2010/0199066 A1* | 8/2010 | Artan | H04L 9/0643 711/216 |
| 2010/0223253 A1 | 9/2010 | Gopal et al. | |
| 2011/0060876 A1 | 3/2011 | Liu | |
| 2011/0066593 A1 | 3/2011 | Ahluwalia et al. | |
| 2011/0078134 A1 | 3/2011 | Bendel et al. | |
| 2011/0107021 A1 | 5/2011 | Muthukumarasamy et al. | |
| 2011/0283082 A1 | 11/2011 | McKenney et al. | |
| 2011/0307471 A1 | 12/2011 | Sheinin | |
| 2012/0011133 A1 | 1/2012 | Faerber et al. | |
| 2012/0011144 A1 | 1/2012 | Transier et al. | |
| 2012/0036134 A1 | 2/2012 | Malakhov | |
| 2012/0117055 A1 | 5/2012 | Al-omari et al. | |
| 2012/0136846 A1 | 5/2012 | Song et al. | |
| 2012/0136889 A1 | 5/2012 | Jagannathan et al. | |
| 2012/0143877 A1 | 6/2012 | Kumar et al. | |
| 2012/0158729 A1 | 6/2012 | Mital et al. | |
| 2012/0166400 A1 | 6/2012 | Sinclair et al. | |
| 2012/0173517 A1 | 7/2012 | Lang et al. | |
| 2012/0260349 A1 | 10/2012 | Nagai et al. | |
| 2012/0303633 A1 | 11/2012 | He et al. | |
| 2012/0310917 A1 | 12/2012 | Sheinin et al. | |
| 2013/0046949 A1 | 2/2013 | Colgrove et al. | |
| 2013/0138628 A1 | 5/2013 | Bensberg et al. | |
| 2013/0218934 A1 | 8/2013 | Lin et al. | |
| 2013/0325900 A1 | 12/2013 | Barber et al. | |
| 2014/0006379 A1 | 1/2014 | Arndt et al. | |
| 2014/0025648 A1 | 1/2014 | Corbett et al. | |
| 2014/0074819 A1 | 3/2014 | Idicula | |
| 2014/0108489 A1 | 4/2014 | Glines et al. | |
| 2014/0129568 A1 | 5/2014 | Kim et al. | |
| 2014/0214794 A1 | 7/2014 | Attaluri et al. | |
| 2014/0214795 A1 | 7/2014 | Attaluri et al. | |
| 2014/0214855 A1 | 7/2014 | Attaluri | |
| 2014/0215019 A1 | 7/2014 | Ahrens | |
| 2014/0337375 A1 | 11/2014 | Yue | |
| 2014/0372388 A1 | 12/2014 | Allaluri et al. | |
| 2014/0372392 A1 | 12/2014 | Liu | |
| 2015/0088813 A1 | 3/2015 | Lahiri et al. | |
| 2015/0301743 A1 | 10/2015 | Nagoa et al. | |
| 2016/0147457 A1 | 5/2016 | Legler et al. | |

FOREIGN PATENT DOCUMENTS

| | | |
|---|---|---|
| CN | 101013427 A1 | 8/2007 |
| CN | 101067822 A1 | 11/2007 |
| CN | 1003672239 C | 2/2008 |
| CN | 101231657 A | 7/2008 |
| CN | 101388042 A | 3/2009 |
| CN | 102893265 A | 1/2013 |
| CN | 103635902 A | 3/2014 |
| CN | 104021205 A | 9/2014 |
| CN | 104317966 A | 1/2015 |
| EP | 0457707 A2 | 11/1991 |
| WO | 2015078136 A1 | 6/2015 |

OTHER PUBLICATIONS

Anonymous, "High Performance Technique Using Join Collocation in a Massively Parallel Processing Relational Database Implementation", Jun. 14, 2012, pp. 1-5, IP.com, United States.

Anonymous, "CashMap: Processor Cache-Aware Implementation of Hash Tables", Jul. 5, 2013, pp. 1-7, IP.com, United States.

Anonymous, "Efficient Grouping Over Joins of Compressed Tables", Apr. 6, 2010, pp. 1-6, IP.com, United States.

Korn, D., et al., "The VCDIFF Generic Differencing and Compression Data Format (RFC3284)", Jul. 1, 2002, pp. 1-31, Network Working Group, IP.com, United States.

Hu, K. et al. "Rapid multi-dimension hierarchical algorithm in data warehouse system", Computer Integrated Manufacturing Systems, Jan. 2007, pp. 196-201, vol. 13, No. 1, China [English-language translation: Abstract Only].

Spyros, B., et al., "Design and Evaluation of Main Memory Hash Join Algorithms for Multi-core CPUs", SIGMOD Int'l Conference on Management of Data, Ju.

Raman, V., et al., "DB2 with BLU Acceleration: So Much More than Just a Column Store", Proceedings of the VLDB Endowment, Aug. 2013, pp. 1-12, vol. 6, No. 11, ACM, United States.

Mell, P., et al., "The NIST Definition of Cloud Computing", National Institute of Standards and Technology Special Publication 800-145, Sep. 2011, pp. 1-7, U.S. Department of Commerce, United States.

(56) References Cited

OTHER PUBLICATIONS

Yan, W.P. et al., "Performing Group-By Before Join", Proceedings 10th Int'l Conference on Data Engineering, 1994, pp. 1-30, IEEE, United States.
Cleary, J.G., "Compact Hash Tables Using Bidirectional Linear Probing", IEEE Transactions on Computers, Sep. 1994, pp. 828-834, vol. C-33, No. 9, United States.
Nan Hua. H., et al., "Rank-Indexed Hashing: A Compact Construction of Bloom Filters and Variants", IEEE, 2008, pp. 73-82, United States.
Xu, Y., "A Multi-Dimesional Progressive Perfect Hashing for High-Speed String Matching", Seventh ACM/ IEEE Symposium on Architectures for Networking and Communications Systems, 2011, pp. 167-177, IEEE Computer Society, United States.
Chang, S., "Recent Advances of Compact Hashing for Large-Scale Visual Search", Columbia University, Oct. 2012, pp. 1-44, United States.
Wang, W., et al.; "Investigating Memory Optimization of Hash-index for Next Generation Sequencing on Multi-core Architecture", IPDPSW IEEE 26th Inter. Conf., May 21-25, 2012, pp. 665-674, IEEE Computer Society, United States.
Cutt, B., et al.; "Improving Join Performance for Skewed Databases", IEEE, 2008, pp. 1-5, United States.
Li, Q., et al.; "Adaptively Reordering Joins during Query Execution", IEEE, 2007, pp. 26-35, United States.
Internet Society, et al., "The VCDIFF Generic Differencing and Compression Data Format (RFC3284)", Jul. 1, 2002, pp. 1-31, Network Working Group, IP.com, United States.
Hu, K. et al. "Rapid multi-dimension hierarchical algorithm in data warehouse system", Computer Integrated Manufacturing Systems, Jan. 2007, p. 196-201, vol. 13, No. 1, China.
Lehman, T.J. "Design and Performance Evaluation of a Main Memory Relational Database System." 1986, PhD Dissertation, 334 pages, [Abstract Only], University of Washington, Madison, WI.
Leis, V., et al., "The Adaptive Radix Tree: ARTful Indexing for Main-Memory Databases", IEEE 29th International Conference on Data Engineering (ICDE), Apr. 8, 2013, pp. 38-49, IEEE, United States.
Levandoski, J., et al., "The Bw-Tree: A B-tree for New Hardware Platforms", IEEE 29th International Conference on Data Engineering (ICDE), Apr. 8, 2013, pp. 1-12, IEEE, United States.
Prokopec, A. et al., "Lock-Free Resizeable Concurrent Tries", Languages and Compilers for Parallel Computing, 2013, pp. 156-170, vol. 7146, Springer Berlin Heidelberg, Germany.
Areias, M. et al., "A Simple and Efficient Lock-Free Hash Trie Design for Concurrent Tabling", Theory and Practice of Logic Programming, May 14, 2014, pp. 1-10, Arxiv.org, Cornell University Library, United States.
Pandis, I. et al., "PLP: Page Latch-free Shared-everything OLTP", Proceedings of the 37th International Conference on Very Large Data Bases (VLDB Endowment), Aug. 29, 2011-Sep. 3, 2011, pp. 610-621, vol. 4, No. 10, United States.
Sewall, J. et al., "PALM: Parallel Architecture-Friendly Latch-Free Modifications to B+ Trees on Many-Core Processors", Proceedings of the 37th International Conference on Very Large Data Bases (VLDB Endowment), Aug. 29, 2011-Sep. 3, 2011, pp. 795-806, vol. 4, No. 11, United States.
Gao, H. et al., "Lock-free dynamic hash tables with open addressing", Journal of Distributed Computing, Jul. 2005, pp. 21-42, vol. 18, Issue 1, United Kingdom.
Xu, Y., "A Multi-Dimensional Progressive Perfect Hashing for High-Speed String Matching", Seventh ACM/ IEEE Symposium on Architectures for Networking and Communications Systems, 2011, pp. 167-177, IEEE Computer Society, United States.
Marek, R., et al., "TID Hash Joins," CIKM, 1994, pp. 42-49, Gaithersburg, MD, United States.
List of IBM Patents or Patent Applications Treated as Related.
Chinese Office Action dated Dec. 5, 2018 for Chinese Patent Application No. 201610177904.0 from ChinesePatent Office, pp. 1-15, Beijing, China.
Chinese Office Action dated Feb. 12, 2019 for Chinese Patent Application No. 201610177904.0 from Chinese Patent Office, pp. 1-8, Beijing, China.
List of IBM Patents or Patent Applications Treated as Related; Attaluri, G.K., et al., U.S. Appl. No. 16/427,190, filed May 30, 2019.

* cited by examiner

PARALLEL BUILD OF NON-PARTITIONED JOIN HASH TABLES AND NON-ENFORCED N:1 JOIN HASH TABLES

BACKGROUND

Hash joins are a common operator in business intelligence (BI) queries. Hash joins involve many random accesses to hash tables. Conventional systems do partitioned joins by dividing the join hash table into partitions, so that lookups are focused on small data structures, which will fit better in cache. But below a threshold on the hash table size, a non-partitioned join is more efficient because it avoids the costs of partitioning.

SUMMARY

Embodiments relate to building hash tables. One embodiment includes a method for building a hash table over a subset of data in a data set includes partitioning a subset of keys and values in the data set into multiple partitions. A hash table is formed with space reserved for each partition based on cumulative counts for a number of keys and values in each partition of the multiple partitions. Each thread selects one or more partitions and inserts keys and values belonging to the selected one or more partitions into the hash table in the reserved space for those partitions. A compact hash table is created that includes a bitmap and a compacted array.

These and other features, aspects and advantages of the embodiments will become understood with reference to the following description, appended claims and accompanying figures.

DETAILED DESCRIPTION

Aspects of the embodiments are described below with reference to flowchart illustrations and/or block diagrams of methods, apparatus (systems), and computer program products, according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
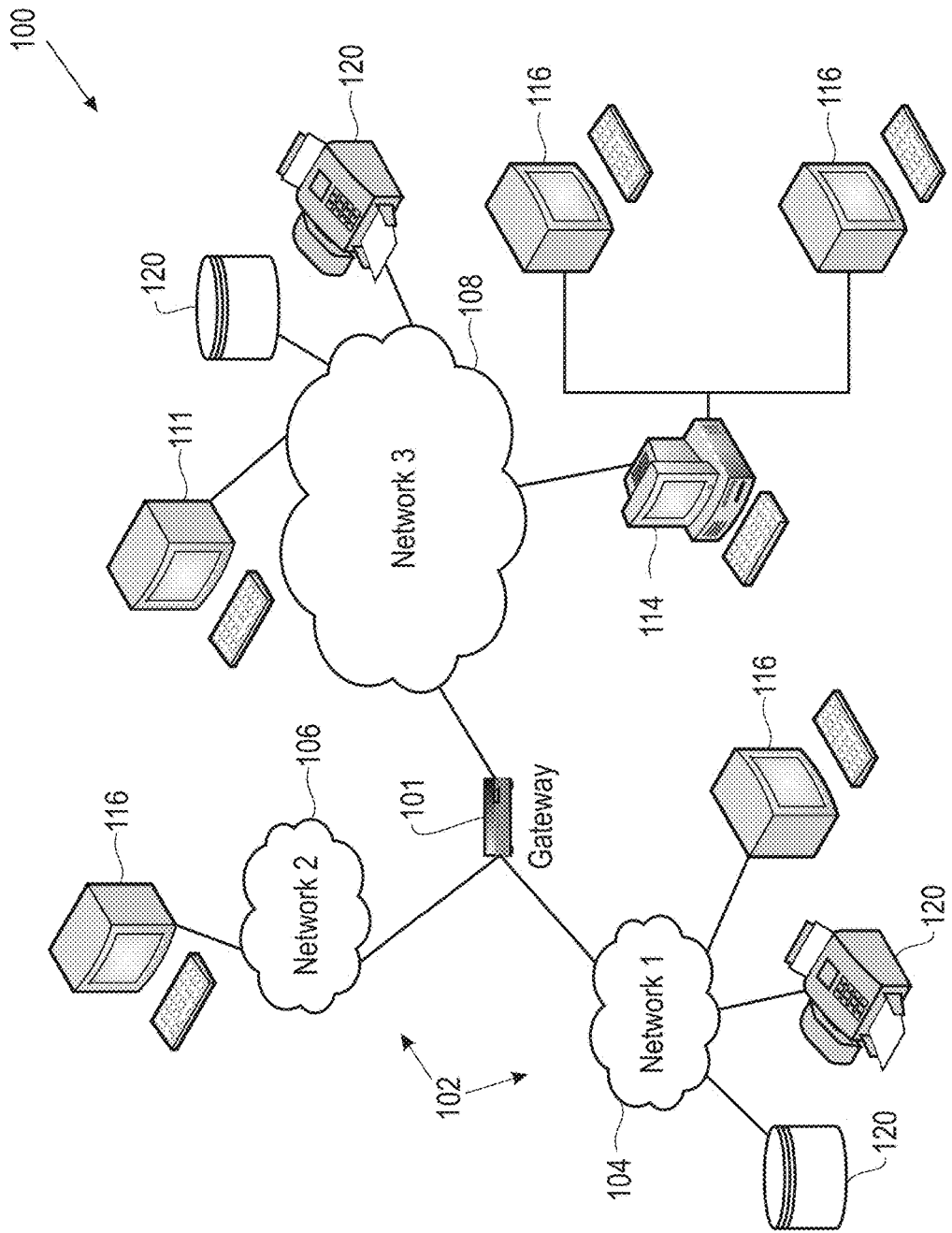
FIG. 1 is a network architecture for storing and recovering data for fast durability and quick journal-less recovery, according to an embodiment.

FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

A hash table (HT) is made up of two parts: an array (the actual table where the data to be searched is stored) and a mapping function, known as a hash function. With a hash table, any value may be used as an index, such as a floating-point value, a string, another array, or even a structure as the index. This index is called the key, and the contents of the array element at that index is called the value. Therefore, an HT is a data structure that stores key/value pairs and can be quickly searched by the key. The hash function is a mapping from the input space to the integer space that defines the indices of the array. The hash function provides a way for assigning numbers to the input data such that the data can then be stored at the array index corresponding to the assigned number.

A hash join is an example of a join process and is used in the implementation of a relational database management system (DMS). The task of a join process is to find, for each distinct value of the join attribute, the set of tuples in each relation which have that value. Hash joins require an equi-join predicate (a predicate comparing values from one table with values from the other table using the equals operator '=').

An inner join creates a new result table by combining column values of two tables (e.g., table1 and table2) based upon the join-predicate. The query compares each row of table1 with each row of table2 to find all pairs of rows which satisfy the join-predicate. When the join-predicate is satisfied, column values for each matched pair of rows of A and B are combined into a result row.

Non-partitioned hash joins perform a join between two inputs by building a single HT on one of the inputs, and performing lookups into this HT with the join columns of the other input. Conventionally, the HT for a non-partitioned join is typically built in one of two ways: built serially with a single thread, and built in parallel using latches on the HT buckets. Both ways result in slow HT builds. Further, conventional methods for building HTs focus on the case of provably n:1 HTs (when there is an index enforcing that each key has at most 1 matching payload), and require a large memory allocation for the case that such an index is not present, due to fill factor overheads from linear probing.

A classic hash join algorithm for an inner join of two relations proceeds as follows. First prepare an HT of the smaller relation. The HT entries consist of the join attribute and its row. Because the HT is accessed by applying a hash function to the join attribute, it is quicker to find a given join attribute's rows by using this table than by scanning the original relation. Once the HT is built, the larger relation is scanned and the relevant rows from the smaller relation are found by looking in the HT. The first phase is usually called the "build" phase, while the second is called the "probe" phase. Similarly, the join relation on which the HT is built is called the "build" input, whereas the other input is called the "probe" input. The process requires that the smaller join relation fits into memory, which is sometimes not the case. A simple approach to handling this situation proceeds as follows:

1. For each tupler in the build input R
   1. Add r to the in-memory HT
   2. If the size of the HT equals the maximum in-memory size:
      1. Scan the probe input S, and add matching join tuples to the output relation
      2. Reset the HT
2. Do a final scan of the probe input S and add the resulting join tuples to the output relation.

In one or more embodiments, the system 100 utilizes a process for providing a parallel build of a compact, non-partitioned join HT, without any latches. One or more embodiments perform partitioning on the join inner, according to the higher order bits of the hash function, and then performing builds of each partition in parallel, with a variant form of linear probing.

One or more embodiments provide building HTs. One embodiment includes a method for building an HT that includes mapping HT keys to values using multiple parallel computation threads. Each thread scans a subset of the HT keys and values and partitions the subset of the HT keys and values into multiple partitions. A cumulative count for HT keys and values in each partition is determined. An HT with space reserved for each partition is formed based on the determined cumulative count. Each thread selects one or more partitions and inserts HT keys and values belonging to the selected one or more partitions into the HT in the reserved space for those partitions.

Figure 2:
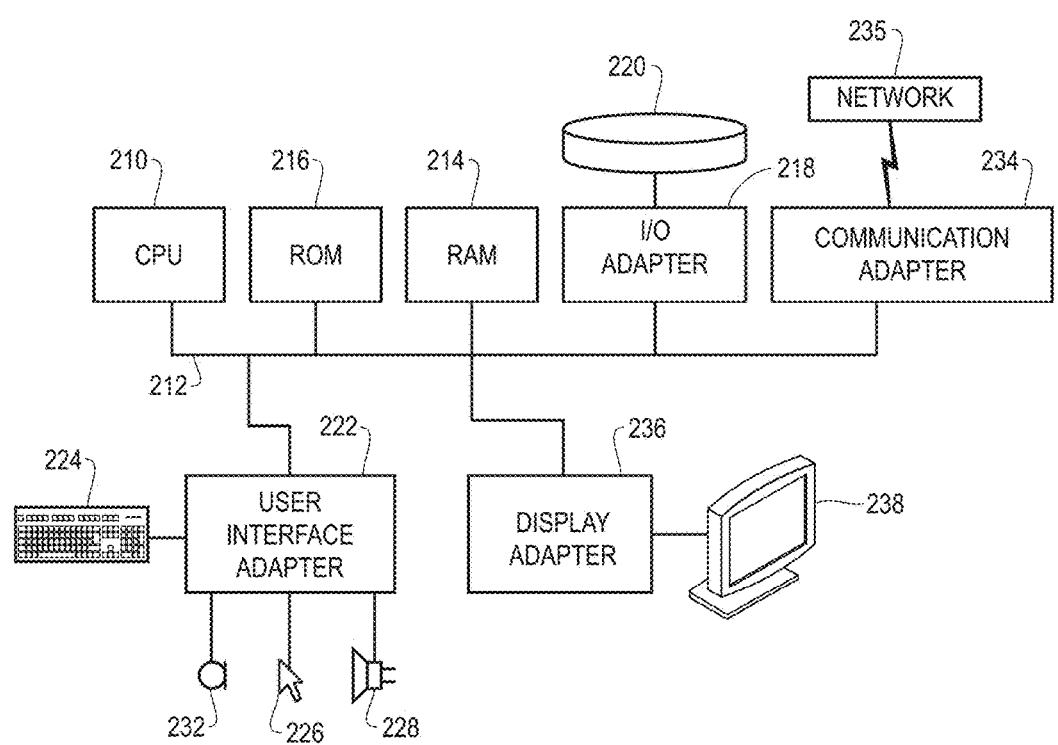
FIG. 2 shows a representative hardware environment that may be associated with the servers and/or clients of FIG. 1.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
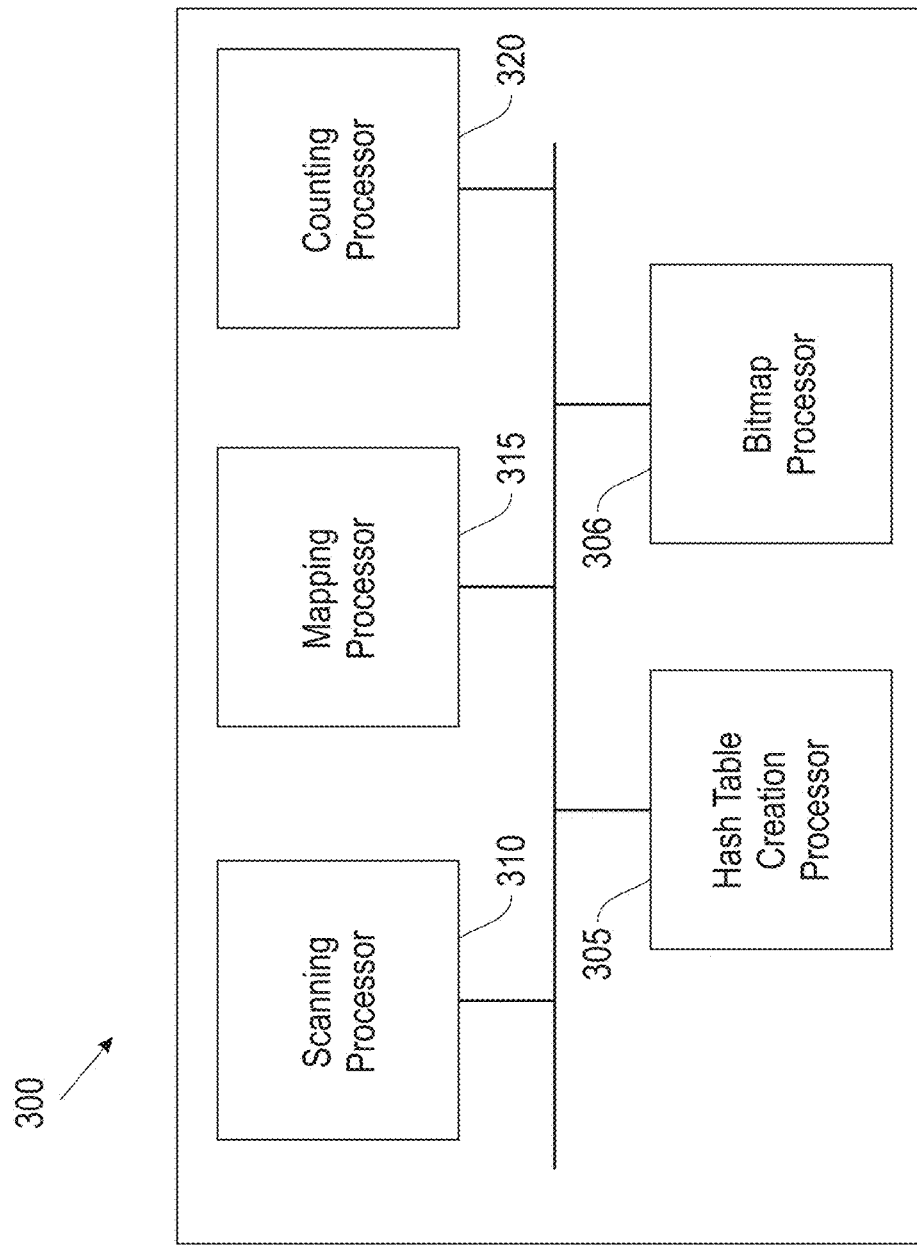
FIG. 3 illustrates a block diagram of an example system for building parallel hash tables and compact hash tables, in accordance with an embodiment.

FIG. 3 illustrates a block diagram of an example system 300 for building parallel HTs and compact HTs, in accordance with an embodiment. In one embodiment, system 300 may include hardware components similar to the architecture shown in FIG. 2. In one embodiment, the system 300 includes an HT creation processor 305, a bitmap processor 306, a scanning processor 310, a mapping processor 315 and a counting processor 320. In one embodiment, the HT creation processor creates a compact HT (CHT) that supports both partitioned and non-partitioned lookups—selected according to the inner cardinality, according to a tradeoff of table size versus partitioning processing time. In one embodiment, the HT creation processor 305 and the scanning processor 310 may perform hash table building and probes in parallel, even when the HT lookups are not partitioned. This provides the the flexibility to use a non-partitioned HT on the probe side for small-medium inners (to avoid partitioning costs), while still having fast parallel builds.

In one embodiment, to keep the HT size small, a linear probing HT that has 100% fill factor in the array of keys and values (payloads) is created, and uses a sparse bitmap to almost entirely avoid collisions. The net result is 2× to 3× smaller table space consumption.

Conventional HT creation has focused on n-1 joins, usually with single-column keys. However, n-m joins show up in many customer queries. Further, even when data almost (or fully) meets n-1 constraints, the constraints are not always enforced via indexes. In one embodiment, generalizations of CHT and a join for n-m joins, 'near' n-1 joins, and left-outer joins are provided by the system 300. In one embodiment, a variant of CHT referred to as a compact array table (CAT) that is collision-free, avoids storing join keys in the HT, and still has nearly 100% fill factor, even without dense join keys is provided by the system 300.

Query predicates are usually on dimension tables, therefore joins are usually highly filtering processes. Conventional joins assume that filtering is performed during the join, and so advocate 'late materialization' (i.e. join just maps key to RID, and only at the end maps row identifier (RID) to payload columns). In one embodiment, a CHT bitmap is used as a Bloom filter to eliminate most non-matching join outers—thus processing cost paid is only for 1 bit per inner in this data structure (vs width of key+width of RID in late materialization).

In one embodiment, the mapping processor 315 maps HT keys to values using multiple parallel computation threads. In one embodiment, the scanning processor 310 provides for each thread to scan a subset of one input to the join, and partitions it, using the high order bits of a hash computed on the join key. In one embodiment, after all of the threads complete the scan, the threads exchange among themselves the number of keys in each partition in the subset they scanned, and the counting processor 320 sums up the number of keys in each partition. In one embodiment, the counting processor 320 provides a total count for each partition by summing up the number of keys received for that partition, from each of the scanning threads. In one embodiment, the counting processor 320 computes a cumulative form of the count—that is, the number of keys in all partitions 0, 1, . . . up to each partition. In one embodiment, the counting processor 320 is embedded in the scanning threads itself, and is not a separate processor.

In one embodiment, the HT creation processor provides for each thread to take ownership of one or more partitions, and builds a sub-range of the HT for that partition. In the HT, the sub-range of the array holding keys and payloads is indicated by a starting position given by the cumulative count of the partitions up to (and excluding) the one being built, and extends to a length equal to the number of keys in this partition. In one embodiment, any linear probing (or quadratic probing or other collision resolution technique) is cycled around within this partition alone.

In one embodiment, the system 300 provides for building a CHT as follows. In one embodiment, the scanning processor 310 scans the input (e.g., partitioned as above), and for each key, a hash function is performed on the input and the bit map processor 306 inserts the result into a bitmap. In one embodiment, if there is a collision, it is not known if it is due to a duplicate key or just a hash collision. In the case of duplicate keys, it is desired to eliminate them (and thus save memory), rather than placing them into the CHT. In one embodiment, the duplicate keys are treated as a hash collision until the collision chain length grows beyond a threshold (e.g., 2). At that point, in one embodiment the bitmap processor 305 begins tracking the actual keys that are seen, so that in the future if that same hash bucket is hit the system 300 can detect if it is a collision or not. In one embodiment, two processes may be used to perform the tracking.

In one embodiment, tracking is provided as follows. In one embodiment, a small local HT or similar data structure is used by the bitmap processor 306 to detect and eliminate highly frequent duplicate keys. When tracking starts, a key is placed into the data structure because of high collision chain length. In one embodiment, any key that is not detected as a duplicate in this structure is placed into the CHT bitmap by the bitmap processor 306 and is treated as collisions.

Another embodiment for tracking is provided as follows. In one embodiment, all keys that collide to a chain length of, for example, >2, are taken and placed into an 'overflow' HT. The crucial difference compared to the first tracking embodiment is that these overflow keys are never inserted into the HT. This has huge performance benefits during probe time because it is known that the linear probe chain will never be >2.

In one embodiment, the CHT creation process continues as follows. In one embodiment, the counting processor 320 computes cumulative population counts for the bitmap provided by the bitmap processor 306. In one embodiment, the scanning processor 310 scans the input again, inserts keys and values/payloads into a compacted array, using the population counts from the counting processor 320. In one example, a few duplicate keys may be encountered. In this case, in one embodiment, the CHT creation processor marks the key specially as a duplicate so that the cost of returning the marked keys as join matches is avoided, and also potentially for avoiding the processing cost of copying them into the CHT (although the space the keys take up in the CHT cannot be reclaimed).

Figure 4:
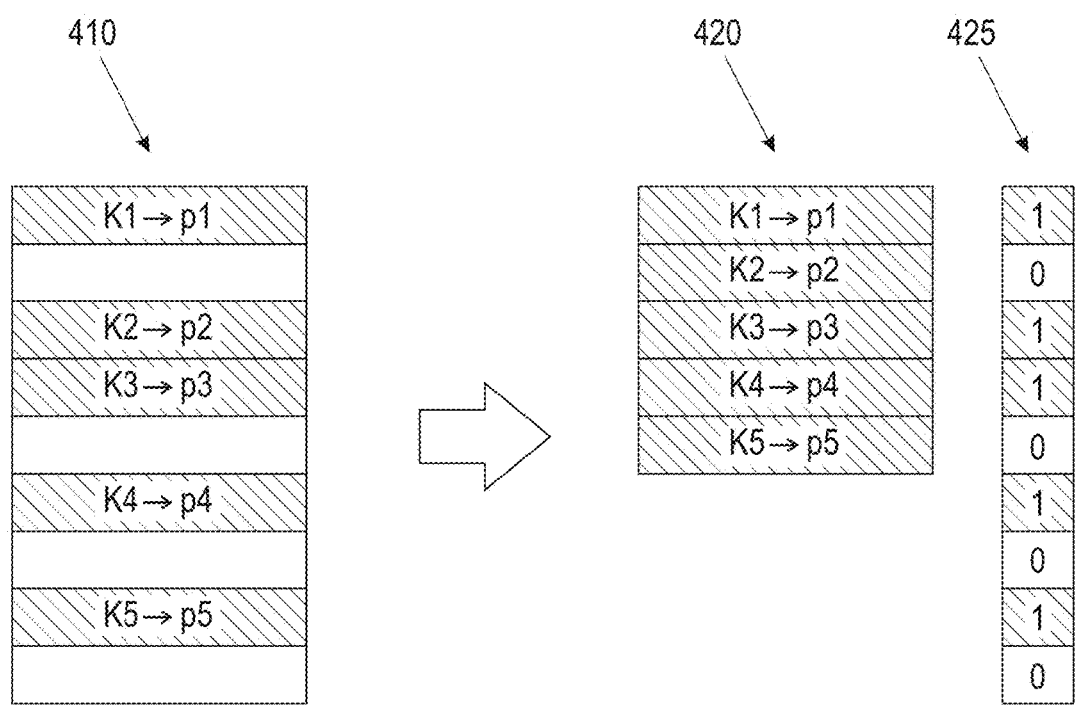
FIG. 4 illustrates an example compact hash table, in accordance with an embodiment.

FIG. 4 illustrates an example compact HT 420, in accordance with an embodiment. Logically, a CHT 420 is a linear probing HT, with very high sparseness (almost no collisions), but in one embodiment all the empty buckets are compressed out as can be seen by comparing the CHT 420 to the un-compressed table 410. In one embodiment, the CHT 420 is made up of two portions: an array of the non-empty buckets 420, and a bitmap 425 (sized to the original uncompressed HT size indicating for each bucket whether it was occupied or not.

In one embodiment, the CHT 420 includes an array of keys (indicated by Kn, where n is a positive integer) and payloads or values (indicated by pn), whose size is the cardinality of the input on which the CHT is built. The Bitvector has a size equal to the size of the HT in the CHT, and it indicates occupied buckets of that HT. In one example, for every 64-bits, a pre-computed 32-bit prefix population count is stored.

Figure 5:
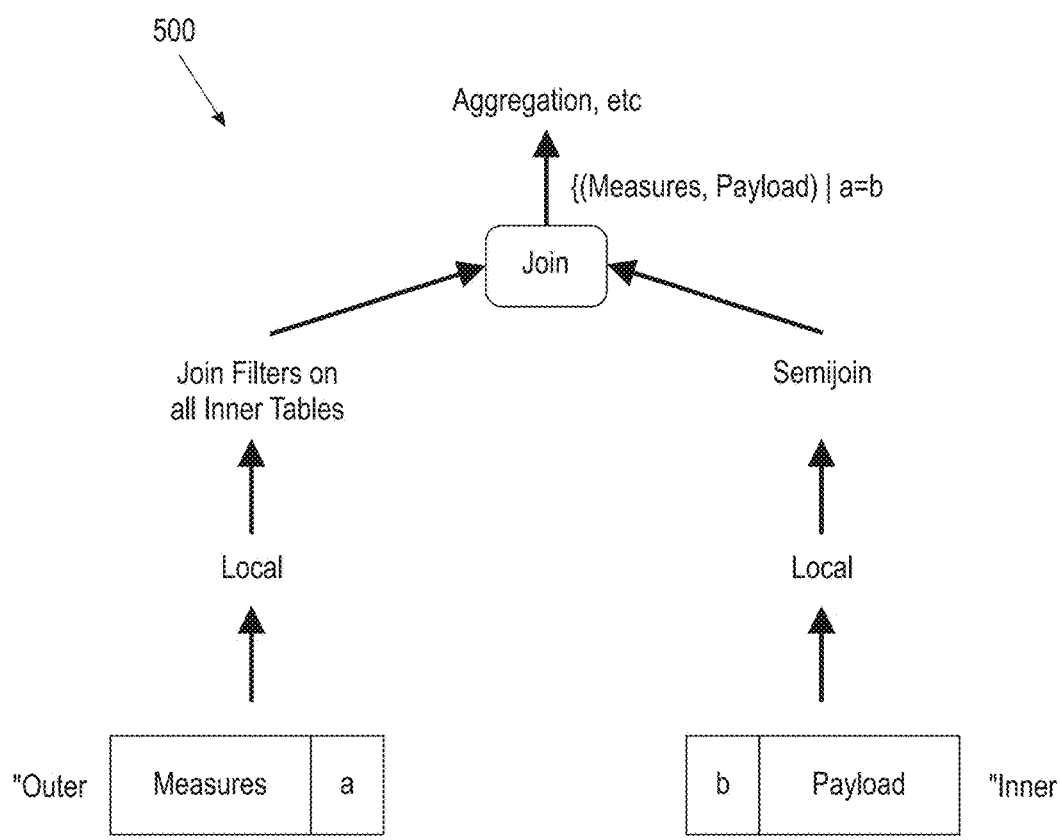
FIG. 5 illustrates an example of a hash join operator flow, in accordance with an embodiment.

FIG. 5 illustrates an example of a hash join operator flow 500, in accordance with an embodiment. There is more to fast joins than just having fast and compact HTs. In one embodiment CHTs are incorporated into a hash join and stitched into a larger query plan. In one embodiment, a two-table equijoin is implemented, and this is fit in a standard query plan. In one embodiment, two tables are being joined, with equality predicate a=b, where a and b are typically single-column, but may be composite.

Figure 6:
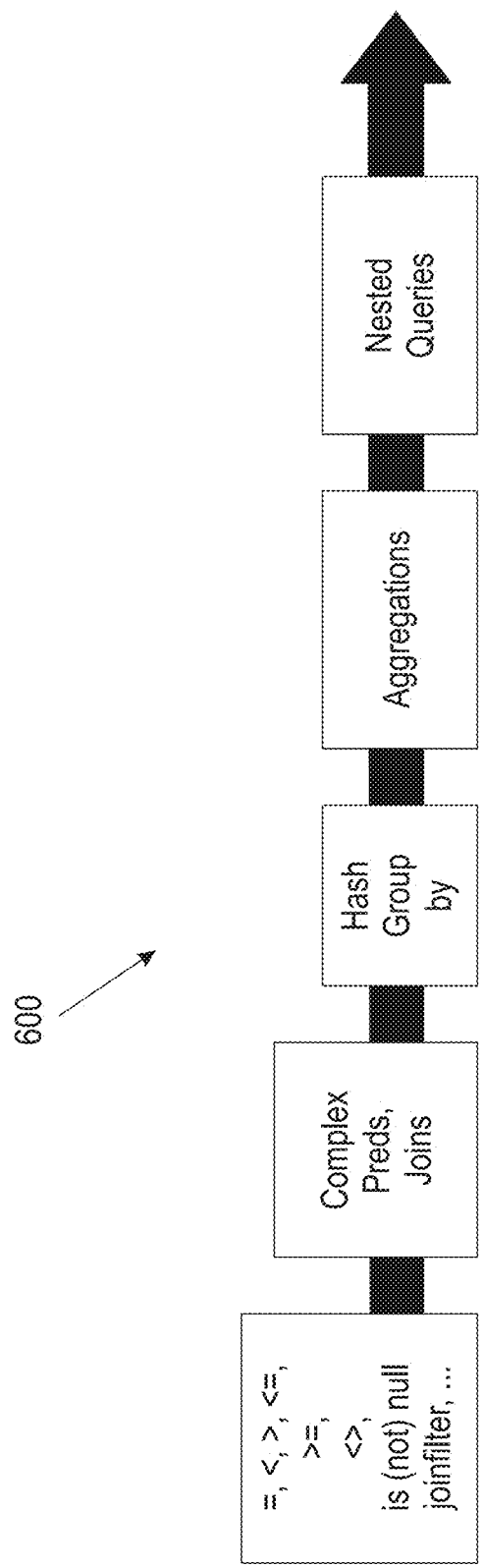
FIG. 6 illustrates an example of a flow for partitioning, in accordance with an embodiment.

FIG. 6 illustrates an example of a flow 600 for partitioning, in accordance with an embodiment. In one embodiment, one of the inputs to a join is scanned, local predicates are applied, an HT is built mapping join columns to auxiliary values needed during the join, and then the other input to the join is scanned, and the join column values are looked up into the HT. In one embodiment, for building the HT, each thread scans a subset of blocks (work stealing), where each thread has its own local HT (no synchronization). HTs are partitioned for cache-efficiency.

Figure 7:
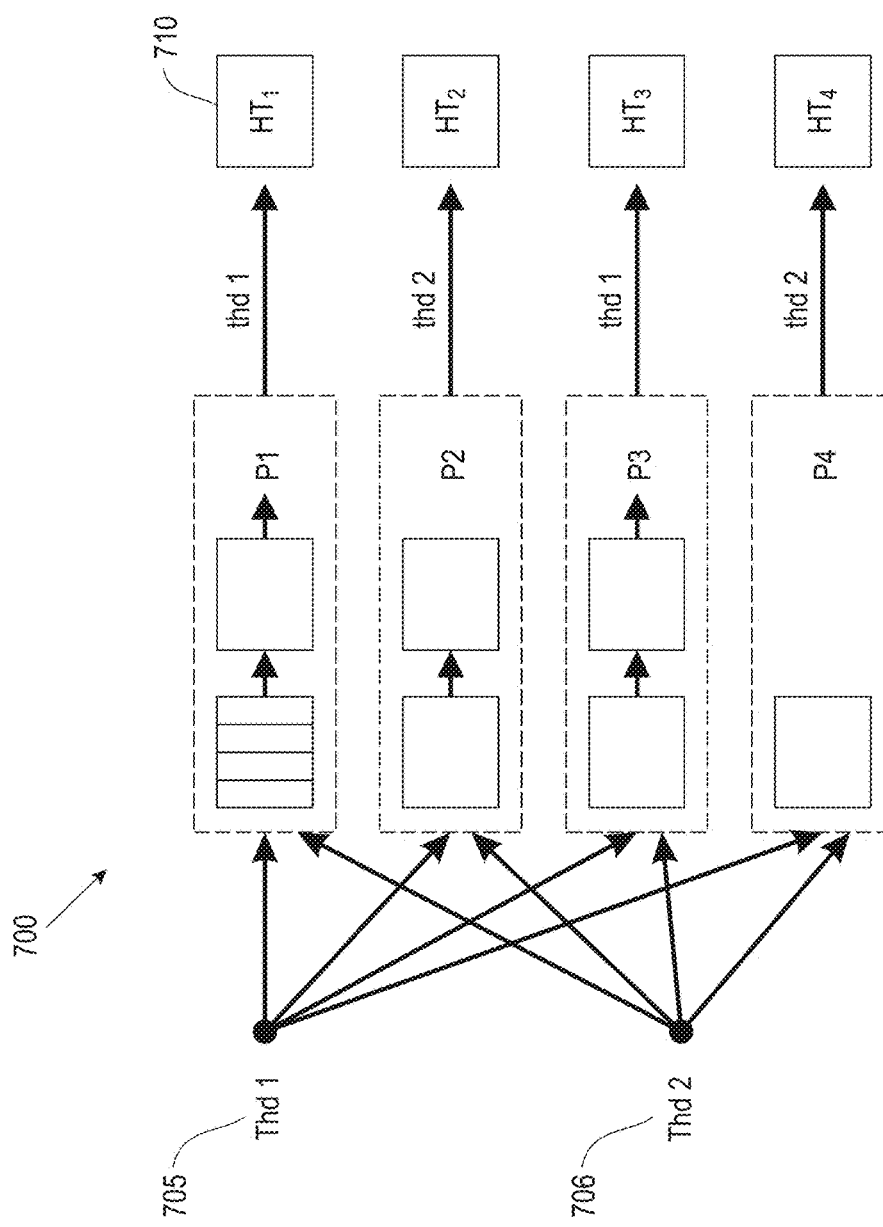
FIG. 7 illustrates thread parallelism for hash table creation, in accordance with an embodiment.

FIG. 7 illustrates thread parallelism for HT creation 700, in accordance with an embodiment. Partitioned joins (PJ) are good both for cache efficiency and also enable easy parallelism during HT build. But in many cases non-partitioned lookups (NPJ) are just as efficient, and they avoid the cost of partitioning. NPJ means building a single HT over the entire join input. Conventionally, this means the build becomes very slow (either serial, or latching overhead due to many threads hitting the same HT—especially if there are popular keys as can happen in n:m and non-enforced n:1 cases). To avoid this slowdown, in one embodiment, one of the join inputs is always partitioned. Then, based on the number of actual qualifying keys, for inners below a threshold (calibrated beforehand), a non-partitioned join is chosen. In one embodiment, even for this NPJ, a single physical CHT is formed. But each thread builds into a sub-range of this CHT bitmap (and any linear probing is cycled around within each sub-range). This way, there is no contention, no need for latches on the HT. The bitmap of a CHT is built based on linear probing. So the natural way to build this is to build an actual linear probe HT—allocating space for an array if |HT| keys, inserting keys and payloads into it with linear probing, and then forming the bitmap based on which buckets are occupied. In one embodiment, for CHT it is desired to have a very sparsely filled HT.

It is noted that if keys are all guaranteed unique (i.e. unique keys with an enforced uniqueness constraint), linear probing may be performed without inserting keys: the position of a key in a linear probe HT can be inferred by just performing linear probing on the CHT bitmap.

But, enforced PK constraints are not very popular with database applications (DBAs) because they impose a unique index maintenance cost during inserts. However, queries sometimes care only for the first match for a join outer—this commonly arises with existential sub-queries and also with group-by. In this case, the input could have duplicate keys, but these should be eliminated, since the join doesn't need them.

Figure 8:
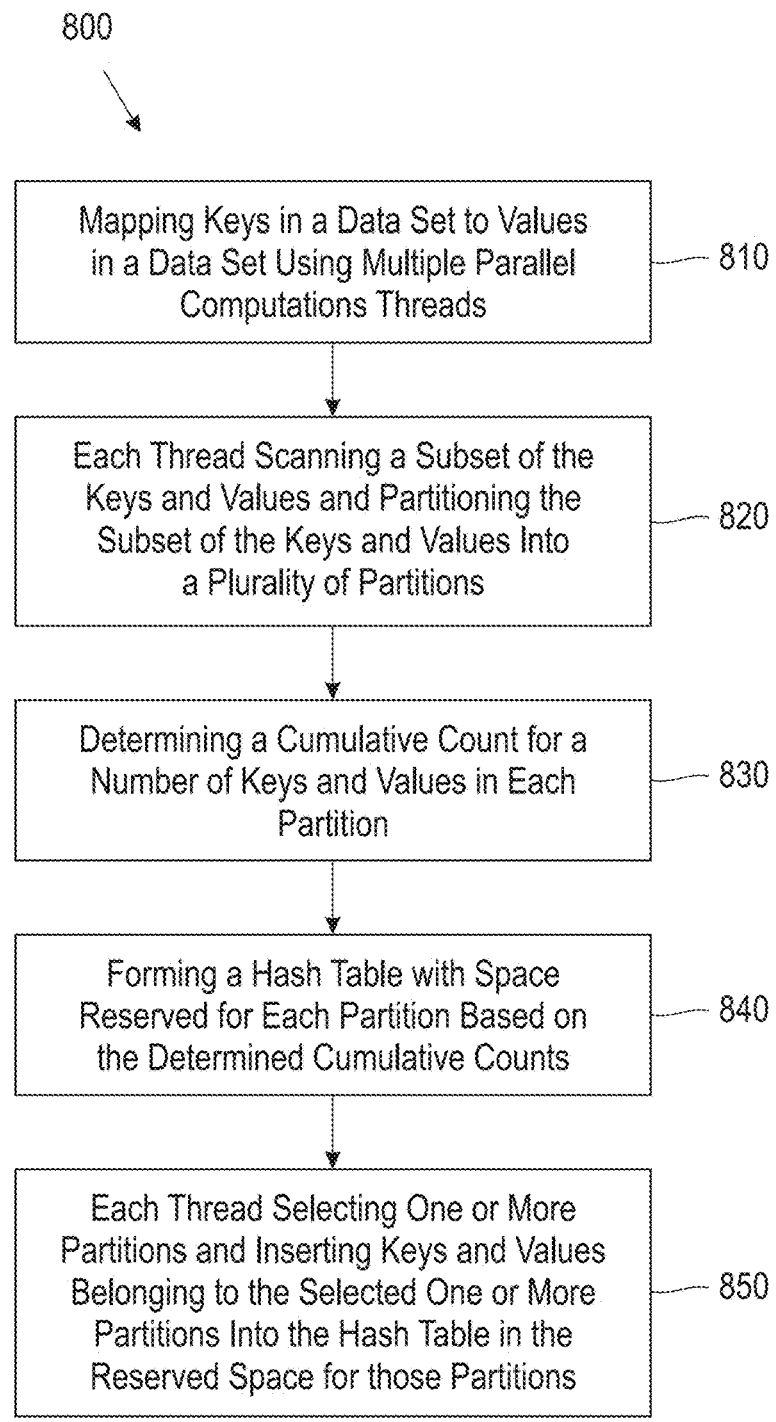
FIG. 8 illustrates a process for generating a hash table, in accordance with an embodiment.

FIG. 8 illustrates a process 800 for generating an HT, in accordance with an embodiment. In one embodiment, in block 810 process 800 provides for mapping keys (values of the join column) to auxiliary values using multiple parallel computation threads. In one embodiment, in block 820 each thread scans a subset of the keys and values and partitions the subset of the keys and values into multiple partitions. In one embodiment, in block 830 a cumulative count for keys and values in each partition is determined. In one embodiment, in block 840 a hash table with space reserved for each partition is formed based on the determined cumulative count. In one embodiment, in block 850 each thread selects one or more partitions and inserts keys and values belonging to the selected one or more partitions into the hash table in the reserved space for those partitions.

In one embodiment, process 800 may choose the subset of the keys and values from a subset of a join input. In one embodiment, partitioning of the subset of the keys and values is performed using bits (e.g., high order) of a hash value computed on a column used in a join predicate. In one embodiment, process 800 may include that determining the cumulative count for keys and values in each partition includes that each thread exchanges with other threads a number of keys in each partition in its subset, and determines the number of keys for each of the partitions by summing the values received from other threads for those partitions, and sums the determined number of keys for each of the partitions for determining the cumulative count up to each partition. For example, the cumulative count up to partition 5 is the sum of the number of keys in partitions 1, 2, 3, and 4.

In one embodiment, process 800 may include that each thread takes ownership of one or more partitions and builds a sub-range of the hash table for that partition. The sub-range includes a sub-range of an array holding keys and payloads and is indicated by a starting position given by the cumulative count of the partitions up to (and excluding) a current partition being built, and extends to a length equal to a number of keys in the current partition. In one embodiment, process 800 may further include creating a compact hash table by: scanning the subset of the hash table keys and values, and for each key, performing a hash operation and inserting hashed keys into a bitmap; determining cumulative population counts for hash table keys and values for the bitmap; repeating scanning of the subset of the hash table keys and values; and inserting the hash table keys and values into a compacted array using the cumulative population counts. In one embodiment, process 800 may provide that the compacted array for the compact hash table contains one entry for each distinct key.

In one embodiment, process 800 may include treating duplicate keys as a hash collision until a collision chain length reaches a predetermined threshold, and then tracking of hash table keys. In one embodiment, tracking hash table keys in process 800 may include: inserting the duplicate keys in a local data structure; and using the local data structure for detecting and eliminating frequent duplicate keys. In one embodiment, the un-detected keys in the local data structure are treated as collisions and placed in the bitmap. In another embodiment, tracking in process 800 may include placing the duplicate keys into an overflow hash table. In one embodiment, the duplicate keys are marked for avoidance of returning the marked duplicate keys as join matches and avoiding copying the marked duplicate keys into the hash table.

Figure 9:
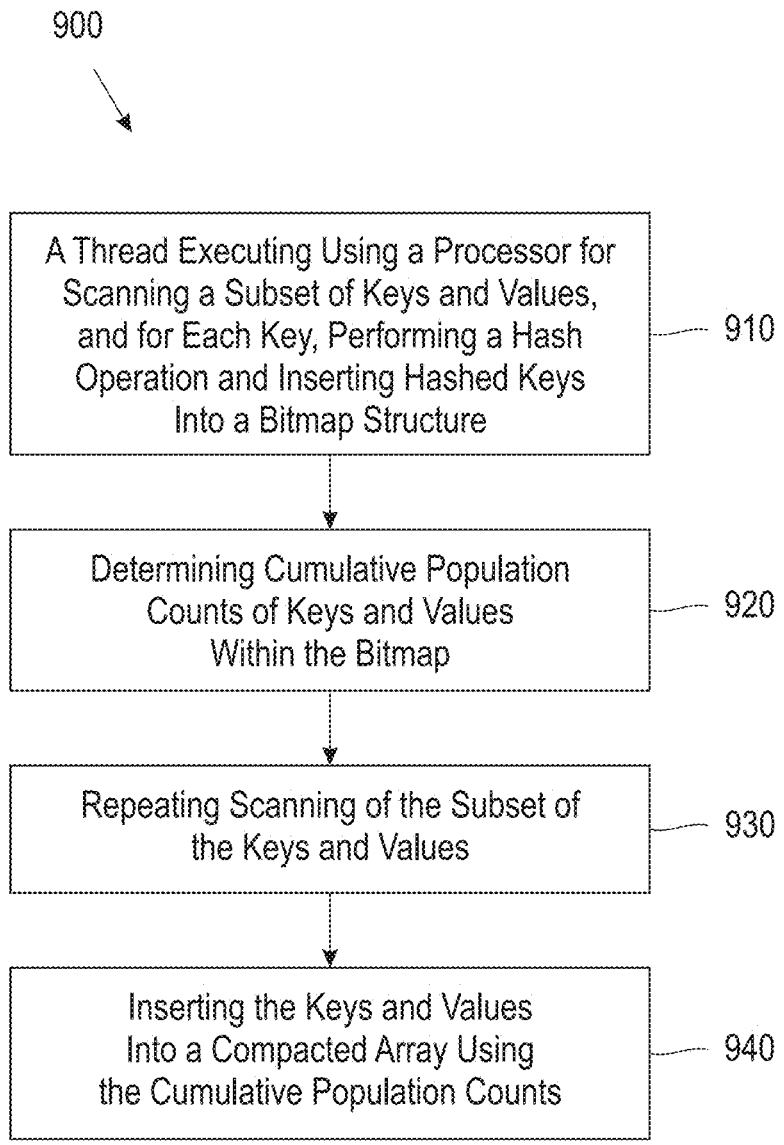
FIG. 9 illustrates a block diagram showing a process for generating a compact hash table, in accordance with an embodiment.

FIG. 9 illustrates a block diagram showing a process 900 for generating a CHT, in accordance with an embodiment. In one embodiment, in block 910 a thread executes using a processor for scanning a subset of keys and values, and for each key, performs a hash operation and inserting hashed keys into a bitmap structure. In one embodiment, in block 920 a cumulative population count of hash table keys and values for the bitmap is determined. In one embodiment, in block 930 scanning of the subset of the keys and values is repeated. In one embodiment, in block 940 the hash table keys and values are inserted into a compacted array using the cumulative population counts. In one embodiment, process 900 includes that the compacted array for the compact hash table contains one entry for each distinct key.

In one embodiment, process 900 may include that duplicate keys are treated as a hash collision until a collision chain length reaches a predetermined threshold (e.g., 2), and then tracking of hash table keys is performed. In one embodiment, in process 900, tracking of keys may include inserting the duplicate keys in a local data structure, and using the local data structure for detecting and eliminating frequent duplicate keys. In one embodiment, un-detected keys in the local data structure are treated as collisions and placed in the bitmap. In one embodiment, tracking of hash table keys in process 900 may include placing the duplicate keys into an overflow hash table. In one embodiment, duplicate keys are marked for avoidance of returning the marked duplicate keys as join matches and avoiding copying the marked duplicate keys into the hash table.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. A method for building a hash table over a subset of data in a data set comprising:
   partitioning a subset of keys and values in the data set into a plurality of partitions;
   forming a hash table with space reserved for each partition based on cumulative counts for a number of keys and values in each partition of the plurality of partitions;
   each thread of multiple parallel computation threads selecting one or more partitions and inserting keys and values belonging to the selected one or more partitions into the hash table in the reserved space for those partitions;
   each thread scanning the subset of the keys and values prior to partitioning the subset of the keys and values into the plurality of partitions; and
   creating a compact hash table comprising a bitmap and a compacted array.

2. The method of claim 1, further comprising:
   mapping the keys in the data set to values in the data set using the multiple parallel computation threads; and
   determining the cumulative count for the number of keys and values in each partition of the plurality of partitions.

3. The method of claim 2, wherein the data set comprises an input to a join operation, and partitioning the subset of keys and values is performed using bits of a hash value computed on a column used in a join predicate.

4. The method of claim 2, wherein determining the cumulative count for the keys and values in each partition comprises each thread exchanging, with other threads, a number of keys in each partition in its subset, and summing a number of keys received for each partition from each of the other threads to determine the number of keys for each of the partitions, and summing the number of keys for each of the partitions for determining the cumulative count.

5. The method of claim 4, wherein each thread takes ownership of one or more partitions and builds a sub-range of the hash table for that partition, and the sub-range comprises a sub-range of an array holding keys and payloads and starts at a position indicated by the cumulative count of the partitions up to and excluding a current partition being built, and extends to a length equal to a number of keys in the current partition.

6. The method of claim 2, wherein creating the compact ash table comprises:
   scanning the subset of the keys, and for each key, performing a hash operation and inserting hashed keys into the bitmap;
   determining cumulative population counts for keys and values within the bitmap;
   repeating scanning of the subset of the keys and values; and
   inserting the keys and values into the compacted array using the cumulative population counts.

7. The method of claim 6, wherein duplicate keys are treated as a hash collision until a collision chain length reaches a predetermined threshold, and then tracking of keys is performed.

8. The method of claim 7, wherein tracking of keys comprises:
   inserting the duplicate keys in a local data structure; and
   using the local data structure for detecting and eliminating frequent duplicate keys, wherein un-detected keys in the local data structure are treated as collisions and placed in the bitmap.

9. The method of claim 7, wherein tracking of keys comprises:
   placing the duplicate keys into an overflow hash table.

10. The method of claim 7, wherein duplicate keys are marked for avoidance of returning the marked duplicate keys as join matches and avoiding copying the marked duplicate keys into the hash table.

11. A computer program product for building a hash table over a subset of data in a data set, the computer program product comprising a computer readable storage medium having program code embodied therewith, the program code executable by a processor to:
   partition, by the processor, a subset of keys and values in the data set into a plurality of partitions;
   form, by the processor, a hash table with space reserved for each partition based on cumulative counts for a number of keys and values in each partition of the plurality of partitions;
   select, by each thread of multiple parallel computation threads, one or more partitions and insert keys and values belonging to the selected one or more partitions into the hash table in the reserved space for those partitions;
   scan, by each thread, the subset of the keys and values; and
   create, by the processor, a compact hash table comprising a bitmap and a compacted array.

12. The computer program product of claim 11, wherein the program code is further executable by the processor to:
   map, by the processor, the hash keys in the data set to values in the data set using the multiple parallel computation threads; and
   determine, by the processor, the cumulative count for the number of keys and values in each partition.

13. The computer program product of claim 12, wherein:
   the data set comprises an input to a join operation; and
   partitioning the subset of the keys and values is performed using bits of a hash value computed on a column used in a join predicate.

14. The computer program product of claim 13, wherein:
   the cumulative count for keys and values in each partition is determined based on each thread exchanging, with other threads, a number of keys in each partition in its subset, summing a number of keys received for each partition from each of the other threads to determine the number of keys for each of the partitions, and summing the number of keys for each of the partitions for determining the cumulative count.

15. The computer program product of claim 14, wherein:
   each thread takes ownership of one or more partitions and builds a sub-range of the hash table for that partition; and
   the sub-range comprises a sub-range of an array holding keys and payloads and starts at a position indicated by the cumulative count of the partitions up to a current and excluding a current partition being built, and extends to a length equal to a number of keys in the current partition.

16. The computer program product of claim 12, wherein the compact hash table is created by:
   scanning the subset of the keys, and for each key, performing a hash operation and inserting hashed keys into the bitmap;
   determining cumulative population counts of keys and values within the bitmap;
   repeating scanning of the subset of the keys and values; and
   inserting the keys and values into the compacted array using the cumulative population counts.

17. The computer program product of claim 16, wherein duplicate keys are treated as a hash collision until a collision chain length reaches a predetermined threshold, and then tracking of keys is performed.

18. The computer program product of claim 17, wherein tracking of keys comprises:
   inserting the duplicate keys in a local data structure; and
   using the local data structure for detecting and eliminating frequent duplicate keys, wherein un-detected keys in the local data structure are treated as collisions and placed in the bitmap.

19. The computer program product of claim 17, wherein tracking of keys comprises:
   placing the duplicate keys into an overflow hash table, wherein duplicate keys are marked for avoidance of returning the marked duplicate keys as join matches and avoiding copying the marked duplicate keys into the hash table.

* * * * *